United States Patent
Cosentino et al.

(10) Patent No.: US 12,472,961 B2
(45) Date of Patent: Nov. 18, 2025

(54) VEHICLE CONTROL USING SERVERLESS FUNCTIONS

(71) Applicant: Red Hat, Inc., Raleigh, NC (US)

(72) Inventors: Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 330 days.

(21) Appl. No.: 17/898,855

(22) Filed: Aug. 30, 2022

(65) Prior Publication Data

US 2024/0067193 A1     Feb. 29, 2024

(51) Int. Cl.
*B60W 50/04*     (2006.01)
*B60W 10/04*     (2006.01)
*G06F 8/65*      (2018.01)

(52) U.S. Cl.
CPC ............ *B60W 50/04* (2013.01); *B60W 10/04* (2013.01); *G06F 8/65* (2013.01); *B60W 2556/45* (2020.02)

(58) Field of Classification Search
CPC .. B60W 50/04; B60W 10/04; B60W 2556/45; G06F 8/65; G06F 21/44; B60K 2028/003
USPC .......................................................... 701/1
See application file for complete search history.

(56) References Cited

U.S. PATENT DOCUMENTS

| | | | | |
|---|---|---|---|---|
| 2022/0080977 | A1* | 3/2022 | Ucar | B60W 40/09 |
| 2022/0222071 | A1* | 7/2022 | Dell'Osa | G06F 8/77 |
| 2023/0391345 | A1* | 12/2023 | Sarkar | H04W 4/40 |

FOREIGN PATENT DOCUMENTS

| | | |
|---|---|---|
| CN | 111144606 B | 9/2020 |
| CN | 109669436 B | 4/2021 |
| CN | 112631257 B | 12/2021 |
| CN | 114676950 A | 6/2022 |
| KR | 102426581 B1 | 7/2022 |
| WO | 2021165734 A1 | 8/2021 |

OTHER PUBLICATIONS

Koopman et al.; Toward a Framework for Highly Automated Vehicle Safety Validation; Apr. 2018; 14 pgs; Carnegie Mellon University; Edge Case Research LLC.

\* cited by examiner

*Primary Examiner* — Muhammad Shafi
(74) *Attorney, Agent, or Firm* — Kilpatrick Townsend & Stockton LLP

(57) ABSTRACT

Systems and methods for cloud-based vehicle control are generally described. In some examples, first vehicle identifier data identifying a first vehicle may be received. In some cases, first state data representing a first software version of a first system associated with the first vehicle identifier data may be received. In some examples, a first condition associated with the first system may be determined based at least in part on the first state data. In further examples, first control data may be sent to a first computing device of a first vehicle based at least in part on the first condition. In various examples, the first control data may be effective to control operation of at least one component of the first vehicle.

19 Claims, 6 Drawing Sheets

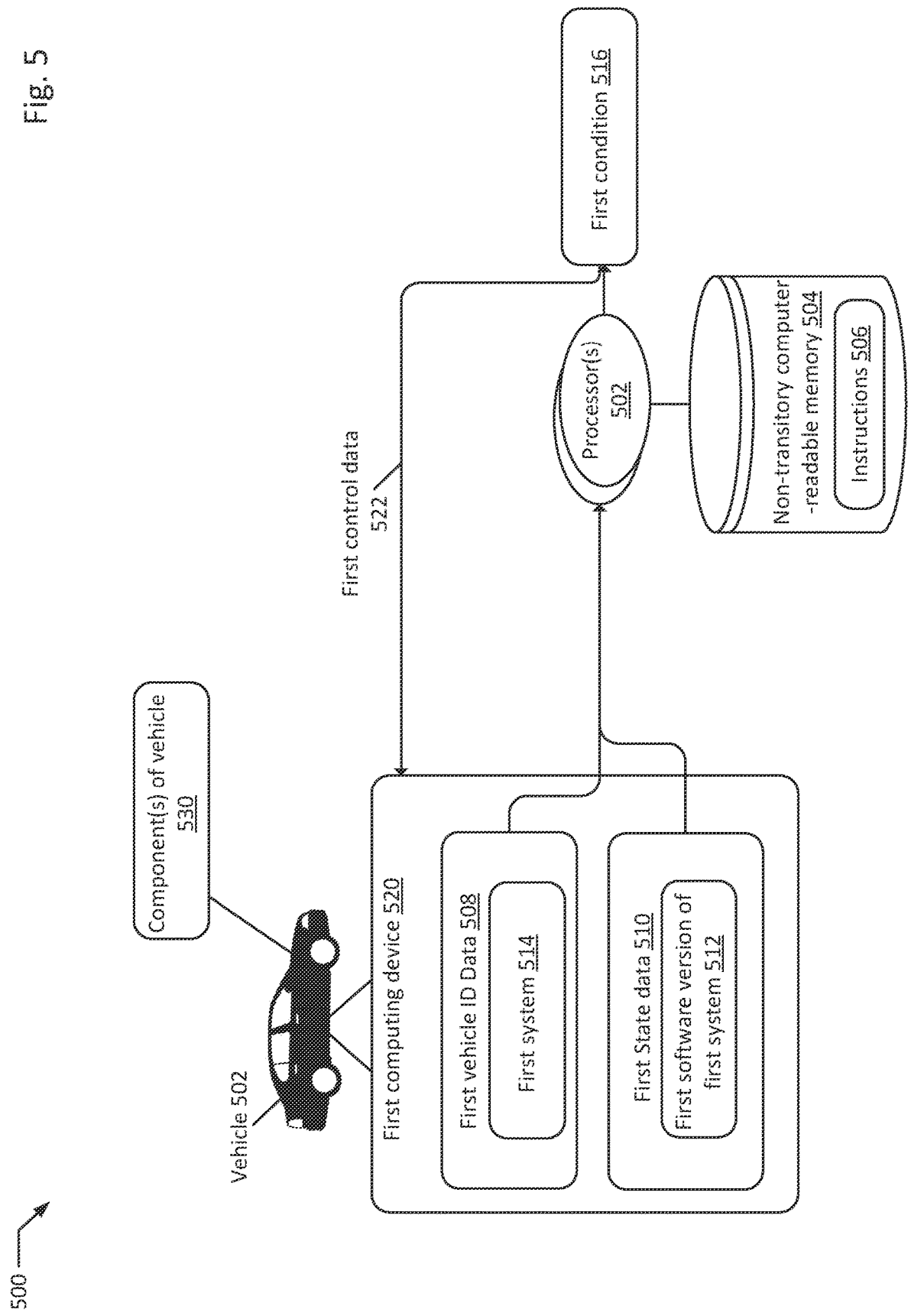

VEHICLE CONTROL USING SERVERLESS FUNCTIONS

BACKGROUND

The present disclosure generally relates to authentication between computing devices and secure remote entry control systems for vehicles. Authentication, encryption, and secure communication techniques are used by many different kinds of computing devices to prevent third party devices from reading communications between the computing devices and/or gaining unauthorized access. Limiting the number of messages that are encrypted with the same encryption key, over time, helps reduce the risk of a successful cryptanalysis brute-force attack.

SUMMARY

The present disclosure provides a new and innovative system, methods and apparatus for vehicle control using serverless functions. In an example, a method that may be used to provide vehicle control is generally described. In various examples, first vehicle identifier data identifying a first vehicle may be received. In some further examples, first state data representing a first software version of a first system associated with the first vehicle identifier data may be received. In some cases, a first condition associated with the first system may be determined based at least in part on the first state data. In various other examples, first control data may be sent to a first computing device of a first vehicle based at least in part on the first condition. In yet other examples, the first control data may be effective to control operation of at least one component of the first vehicle.

In another example, a system for vehicle control is generally described. In some examples, the system may comprise at least one processor. In various further examples, the system may include non-transitory computer-readable memory storing instructions that, when executed by the at least one processor, are configured to receive first vehicle identifier data identifying a first vehicle. In various examples, the instructions, when executed by the at least one processor, may be further effective to receive first state data representing a first software version of a first system associated with the first vehicle identifier data. In yet other examples, the instructions, when executed by the at least one processor, may be further effective to determine, based at least in part on the first state data, a first condition associated with the first system. In still other cases, the instructions, when executed by the at least one processor, may be further effective to send first control data to a first computing device of the first vehicle based at least in part on the first condition, the first control data effective to control operation of at least one component of the first vehicle.

In yet another example, another method to provide vehicle control is generally described. In some examples, the method may include sending, by first computing device of a first vehicle, first vehicle identifier data to a serverless function. In various cases, the method may include sending, by the first computing device, first state data representing a first software version of a first system associated with the first vehicle identifier data. In still other examples, the method may include receiving, from the serverless function by the first computing device, first control data effective to control operation of at least one component of the first vehicle, wherein the first control data is determined based at least in part of a first condition of the first vehicle that is determined using the first state data.

Additional features and advantages of the disclosed methods, devices, and/or systems are described in, and will be apparent from, the following Detailed Description and the Figures.

BRIEF DESCRIPTION OF THE FIGURES

FIG. 5 is block diagram of an example system for cloud-based vehicle control according to an example of the present disclosure.

DETAILED DESCRIPTION OF EXAMPLE EMBODIMENTS

Figure 1:
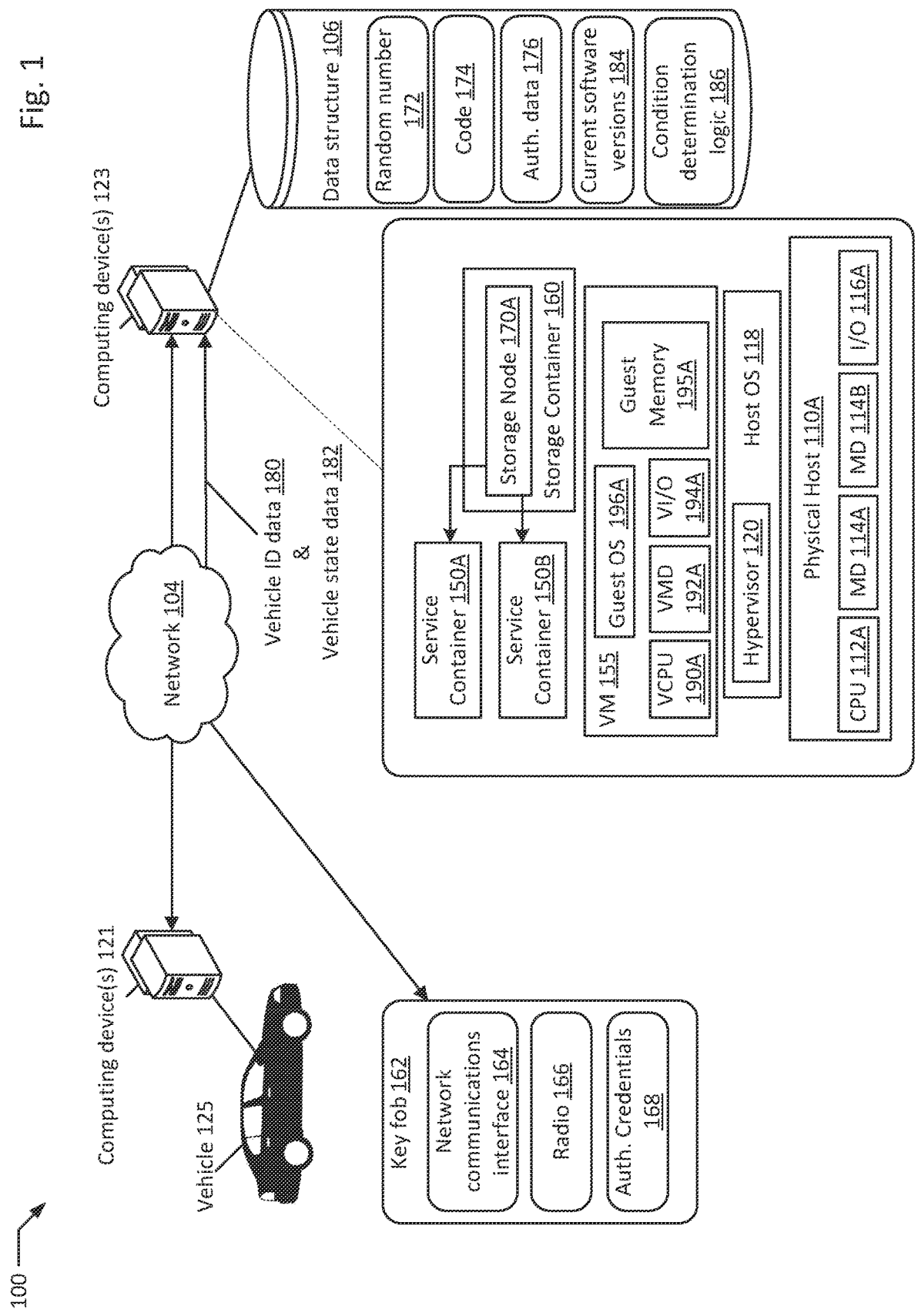
FIG. 1 is a block diagram of a computer communication system, according to various examples of the present disclosure.

Vehicles continue to employ more and more computer systems and sub-systems for operation, control, monitoring, entertainment, etc. In some cases, software executing on such systems may be updated over time. For example, security flaws and/or bugs (e.g., faulty code) may be detected in a current version of software. In some cases, software flaws such as those described above may lead to a malfunctioning system in the car. For example, a thermostat system may have faulty code that provides inaccurate temperature readings. In some cases, this faulty code may lead to overheating of the vehicle and potentially even a fire. In another example, software that implements a control algorithm for anti-lock brakes may have a bug and/or may need an update in order to account for a particular tire temperature and/or road condition. In some cases, software dependencies may lead to problems and/or values from one software sub-system being propagated to another.

Typically, such flaws in vehicle components (whether software or hardware), when detected, are the basis for a vehicle recall in which the manufacturer requests that the owner of the vehicle bring the vehicle to a service center for remedial action (e.g., updating the software to a new version, replacing a faulty part, etc.). However, there is no guarantee that every owner will be apprised of the vehicle recall. Some owners may ignore the recall, some owners may never learn of the recall, etc. Additionally, such recalls may require specially trained technicians. Further, operation of the vehicle prior to the repair (e.g., the repair that is the subject of the recall) may be dangerous to the driver and to others. Even the act of driving the vehicle to the manufacturer's repair center may be dangerous and/or may be troublesome given the potentially limited functionality of the vehicle and/or its systems.

In various examples described herein, vehicles report state data that describes current conditions of the vehicle to a cloud-based serverless function. Such state data may include the software versions of the various systems and subsystems of the automobile as well as telemetry data, operating conditions, log messages, etc. The serverless function may include logic (e.g., deployed by the vehicle manufacturer) that may evaluate the received state data to determine if one or more predefined conditions are implicated. In various examples, the state data may be aggregated across many vehicles (e.g., using data aggregation techniques, high dimensional embeddings, etc.) such that the logic may be refined over time to semantically represent a state of the vehicle. Conditions determined by evaluating the logic according to the received state data may be associated with remedial actions (e.g., defined by the manufacturer for the relevant condition).

In the faulty thermostat example described above, the remedial action may be to disable the heating system. As such, the serverless function may generate control data that may be pushed to an electronic control unit (ECU) of the vehicle (e.g., over a data communication network). The control data may be effective to cause the ECU to disable the heating system or prevent the motor of the vehicle from starting (depending on the particular logic and the particular function of the thermostat). In various examples, depending on the determined condition, the control data may permit continued operation of the vehicle, albeit with altered functionality (e.g., the heating system may be disabled while continuing to permit the user to operate the vehicle and/or the maximum temperature setting of the heating system may be capped). In such examples, a notification may be provided to the user (e.g., via a graphical user interface (GUI) of the vehicle, a voice-based notification system, a mobile companion application, etc.) notifying the user of the limited capability and/or an appropriate remedial action. In some other examples, the control data may not permit continued operation of the vehicle, as continued operation of the vehicle may be dangerous until the relevant condition is remedied. For example, if there is a problem with the braking system of the vehicle, the starter of the vehicle and/or engine of the vehicle may be disabled until the appropriate remedial action is taken. In some cases, the control data may include a software update that may remediate the determined condition (e.g., when the condition determination logic determines that the software versions of one or more vehicle systems are out of date). In some examples, certain vehicle systems, sub-systems, and/or components may have priority over others (e.g., in a pre-defined hierarchy). For example, software dependencies may lead to one system being updated before another is updated to prevent error propagation. In various examples, such priority information may affect the order in which different systems are updated and/or which control data is sent to the vehicle. For example, an artificial intelligence systems that autonomously controls vehicle operation may take priority over a control algorithm for anti-lock braking. In some examples, various subsystems may take priority over others. For example, within the artificial intelligence autonomous vehicle control system, a lane departure detection sub-system may take priority over a driver alert sub-system, which in turn may take priority over a particular computer vision algorithm update, etc.

The state data sent to the serverless function from the vehicle's ECU may be encrypted to alleviate privacy concerns. Additionally, the vehicle ECU may authenticate itself to the serverless function. In some cases, in order to authenticate to the serverless function, a key fob and/or other device may be required to be detected by the vehicle ECU, in order to enhance security and/or prevent potentially malicious code from being pushed to the vehicle ECU. This reduces security vulnerabilities that may otherwise be present if authentication was only required for either the serverless function or the vehicle ECU. For example, if a non-authorized user was able to gain access to the serverless function the non-authorized user could potentially push malicious code and/or control vehicles remotely. However, the various authentication procedures described herein involve interplay between the vehicle ECU, the serverless function, and a key fob or other remote device associated with the vehicle and thereby provide enhanced security.

FIG. 1 is a block diagram of a computer communication system 100, according to various examples of the present disclosure. A vehicle 125 may include one or more embedded systems, such as one or more computing device(s) 121. In various examples, the computing device(s) 121 may include network communication hardware effective to allow the vehicle 125 to communicate over a network 104. In various examples, the computing device(s) 121 may include network communication hardware effective to allow the vehicle 125 to communicate over a network 104 (e.g., a wide area network (WAN) such as the Internet). The one or more computing device(s) 121 may comprise one or more ECUs of vehicle 125 and may control operation of different systems (e.g., electronic door locks, ignition systems, trunk locks, climate control systems, etc.) of the vehicle 125. In various examples, the computing device(s) 121 may be or may comprise the "vehicle system" (or a portion thereof) referred to herein. Vehicle 125 and/or computing device(s) 121 may comprise a radio including a transmitter and/or a receiver.

Key fob 162 may be a remote keyless entry system that is associated with vehicle 125. The key fob 162 may include a network communications interface 164 (e.g., network communications hardware) effective to enable the key fob 162 to communicate over a network 104 (e.g., the Internet or another network). Additionally, key fob 162 may comprise a radio 166 including a transmitter and/or a receiver which may enable the key fob 162 to communicate with vehicle 125 and/or computing device(s) 121 via radio frequency (e.g., for situations in which no connection to network 104 is available).

In various examples, upon receipt of a user press (or other activation) of a control on the key fob 162, the key fob may send a radio signal (and/or network communication) to the computing device(s) 121 of vehicle 125. In response, the vehicle 125 may authenticate itself to computing device(s) 123 using authentication data 176. Upon successful authentication, vehicle 125 may generate a random number 172 and may send the random number 172 to the computing device(s) 123 using a secure Internet communication protocol (e.g., HTTPS, TLS, etc.). The computing device(s) 123 may receive the random number 172 and may store the random number 172 in a data structure 106. Although not shown in FIG. 1, in various examples, the computing device(s) 123 and/or a cloud service provided by the computing device(s) 123 may send an instruction to queue the random number 172 in a message of an asynchronous messaging protocol. The message may be associated with the computing device(s) 121 and/or the key fob 162 and may only be accessible after successful authentication with the cloud service provided by computing device(s) 123. The cloud service may input the random number 172 into a cryptographic function (e.g., a hash function) and may generate a code 174 (e.g., the output of the cryptographic function). The cloud service may store the code 174 in the data structure 106. In various examples, the data structure 106 may be associated with the vehicle 125 and/or with the computing device(s) 121.

After generating and storing the code 174, the cloud service instantiated by computing device(s) 123 may send an indication (e.g., a ping) to key fob 162. In response, the key fob 162 may authenticate itself to the cloud service using the authentication data 176 (or other authentication credentials). Upon successful authentication of the key fob 162, the cloud service may retrieve the random number 172 from the messages associated with the key fob 162. The cloud service may input the random number 172 into the cryptographic function to generate a second instance of the unlock code 174. The second instance of the code 174 may be compared with the unlock code 174 which was previously generated in response to the communication with the computing device(s) 121. If the codes match, the cloud service may send an instruction to the computing device(s) 121 effective to perform the requested action (e.g., unlock of one or more doors of vehicle 125, starting a motor of vehicle 125, etc.).

After authentication, the computing device(s) 121 of vehicle 125 may be effective to send vehicle identifier (ID) data 180 that is effective to identify the vehicle 125 from among other vehicles. In addition, the vehicle 125 may send vehicle state data 182 together with the vehicle ID data 180. The vehicle state data 182 may describe a state of the vehicle 125 and/or of various systems/sub-systems of the vehicle 125. For example, the vehicle state data 182 may describe current states of software executing on computing device(s) 121 and/or version numbers of the software. In addition, the vehicle state data 182 may describe other state data of the vehicle. Some examples of state data may include current speed, motor status (e.g., engine/motor "ON" or "OFF"), battery life/fuel remaining, odometer reading, bearing, windshield wiper status, cabin preset temperature, climate system information, fluid levels, tire pressure data, geolocation data, etc. The computing device(s) 123 may use condition determination logic 186 to evaluate the received vehicle state data 182. For example, the computing device(s) 123 may use the vehicle ID data 180 to lookup the condition determination logic 186 that is associated with the vehicle ID data 180. The condition determination logic may evaluate the received vehicle state data 182 using predefined rules and/or thresholds in order to determine one or more conditions associated with the vehicle. For example, if the software version of software used to control the heads up display of the vehicle is out of date with respect to the current software versions 184 that are associated with the vehicle type, a condition may be that the heads up display may not function properly. This may be a dangerous condition. As such, a serverless function executing on one or more of the computing device(s) 123 may send control data to the vehicle 125 to prevent starting the motor/engine of the vehicle 125 until the condition is remedied. In some examples, the control data may cause the software to be updated or may prompt the user to update the vehicle software in order to remedy the condition.

Depending on the condition that is determined using the condition determination logic 186, the vehicle 125 may be disabled (e.g., control data may be sent to the vehicle's ECU to prevent the vehicle from starting), control data may trigger a software update to remedy the condition, and/or the control data may allow limited operation of the vehicle (e.g., if a software issue is causing the climate control system to malfunction the control data may prevent use of the climate control system although the vehicle 125 may otherwise be operated as normal). As previously described, in some examples, different priorities may be determined for modifications of different vehicle systems/sub-systems. Accordingly, the control data sent to the vehicle 125 may be prioritized and/or may include dependencies. For example, vehicle control systems may take precedence over climate systems and/or GPS systems. In some examples, a serverless function may determine various dependencies of different software systems of the vehicle 125 and may determine whether or not to send particular control data to the computing device(s) 121 based on the dependencies. For example, if modification of a first system is determined to affect a second system, the serverless function may wait until the vehicle state data 182 indicates that the dependencies are resolved prior to updating or otherwise modifying the first system. In another example, the order in which control data is sent to and/or applied to systems may be controlled. For example, control data may instruct the vehicle ECU to turn off the climate control system when starting the vehicle's motor/engine, but may thereafter permit operation of the climate control system. In some further examples, the condition determination logic 186 may include one or more machine learning-based encoder networks (e.g., a neural network, an auto-encoder, a transformer-based encoder, etc.) that may receive state data from a plurality of vehicles (e.g., vehicles of the same make and model). Such models may be effective to generate a high-dimensional embedding representing the state data and may determine one or more conditions of the vehicle and/or remedial actions to be taken that may not be apparent when using a rule-based system.

The computing device(s) 121 and 123 may be effective to execute software that is configured to perform the various ECU and/or cloud-based (e.g., serverless function) techniques described herein. FIG. 1 depicts example components that may be included in various implementations of computing device(s) 121 and/or computing device(s) 123. For example, computing device(s) 121 and/or computing device(s) 123 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Computing device(s) 121 and/or computing device(s) 123 may run one or more VMs (e.g., VMs 155), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VIVID 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, storage may be deployed in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator (not shown). In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

Figure 2:
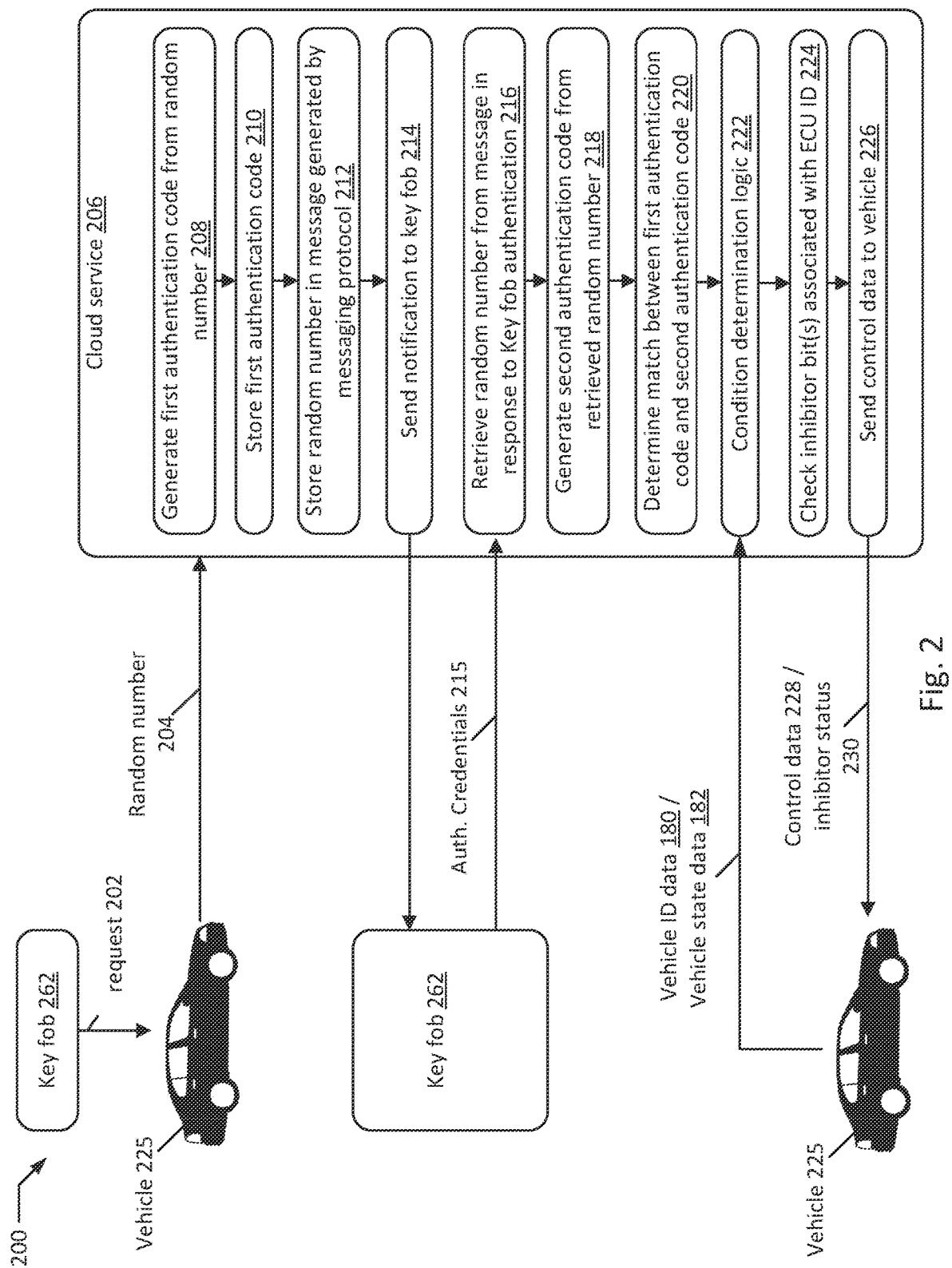
FIG. 2 is a diagram illustrating vehicle control using a cloud-based system, in accordance with various aspects of the present disclosure.

FIG. 2 is a diagram 200 illustrating vehicle control using a cloud-based system, in accordance with various aspects of the present disclosure. In various examples, key fob 262 (or some other device, such as a smart phone, wearable device, etc.) may receive some request from a user, such as a button press, touch input, voice command, etc., representing a user request for the vehicle 225 to perform some action. For simplicity, the request may be a request from the user to start a motor of the vehicle 225. Upon receipt of the request, the key fob 262 may determine if network access is available. If not, the key fob 262 may use a rolling codes approach to communicate with vehicle 225 to unlock the door. However, if network access is available, key fob 262 may send a request 202 to the vehicle 225. The request 202 may be a signal indicating that the vehicle 225 should communicate with cloud service 206 to perform the requested motor start action.

In response to receipt of the unlock request 202, vehicle 225 may check for network access. If network access is available, vehicle 225 may generate a random number 804 (which may instead be a pseudo-random number or even a predefined number). Vehicle 225 may also send identifier data that uniquely identifies the vehicle 225 from among other vehicles (and/or a computing device of vehicle 225 from among other computing devices). The vehicle 225 may authenticate with the cloud service 206 (e.g., by providing access credentials that were previously established during registration with the cloud service). Upon successful authentication, the random number 204 may be sent to cloud service 206 via a secure, encrypted Internet communication protocol. The cloud service 206 may generate a first authentication code from the received random number (block 208). For example, the cloud service 206 may input the received random number into a cryptographic hash function that may generate the first authentication code. The cloud service 206 may store the first authentication code in a data store associated with the vehicle 225 (block 210).

The cloud service may also store the random number in a message generated by a messaging protocol (block 212). The message may be associated with the vehicle 225 and/or the key fob 262. Accordingly, successful authentication with the cloud service 206 may be required in order to access the message. The message may be associated with a time-to-live (TTL) value. Upon expiration of the TTL, the message may be deleted, which may require the procedure described in FIG. 2 to be re-initiated. The cloud service may send a notification to the key fob 262 (block 214) via the secure Internet communication protocol. Upon receipt of the notification from the cloud service 206, the key fob 262 may authenticate to the cloud service 206 (e.g., by providing authentication credentials 215). Upon successful authentication, the cloud service 206 may retrieve messages associated with the key fob 262. The cloud service 206 may retrieve the random number from the message in response to successful key fob authentication (block 216). If there are multiple valid messages, the most recent message may be used. The cloud service 206 may generate a second authentication code by inputting the random number retrieved from the message into the cryptographic hash function (block 218). The cloud service 206 may thereafter retrieve the first authentication code from the data store associated with the vehicle 225 and may compare the first authentication code and the second authentication code. The cloud service 206 may determine that the first authentication code and the second authentication code match (block 220). Thereafter, in response to the first authentication code and the second authentication code matching, the cloud service 206 may use the vehicle ID data 180 sent by vehicle 225 to determine the relevant condition determination logic (block 222). The condition determination logic may be a set of rules implemented using an algorithm executing on the cloud service 206 that may evaluate the vehicle state data 182 received from the vehicle 225 ECU in order to determine whether one or more conditions of concern are present.

In various examples, the condition determination logic may be stored in a data structure in association with the vehicle ID data 180. Accordingly, the cloud service 206 may use the vehicle ID data 180 to query the data structure to determine the condition determination logic. The condition determination logic may specify rules and/or thresholds related to various components, systems, and/or subsystems of the vehicle. In addition, in some examples, the condition determination logic may specify the most recent software versions associated with the various components, systems, and/or subsystems of the vehicle 225 (e.g., the current software versions). For example, there may be a rule that prohibits starting the motor of the vehicle when the software version artificial intelligence algorithm used to control operation of the vehicle 225 is out of date. In such an example, the cloud service may check an inhibitor bit (block 224). The inhibitor bit, if set, may prevent starting the vehicle 225. The inhibitor bit may be set by cloud service 206 and/or by another computing device that is properly authenticated to the cloud service 206. For example, a vehicle manufacturer, a law enforcement or government agency, etc., may be provided with authentication credentials to cloud service 206 and may be set the inhibitor bit. For example, if the vehicle 225 is reported stolen, law enforcement officers may contact the vehicle manufacturer who may set the inhibitor bit for the vehicle 225 so that the vehicle motor cannot be started. In another example, there may be a safety issue with vehicle operation. In the example where the artificial intelligence software is out of date, the inhibitor bit may be set by the cloud service 206 to prevent the vehicle from being started. In another example, control data may be sent to the vehicle (e.g., control data 228) that may force the vehicle 225 to update the artificial intelligence software. In addition, the control data 228 may prevent starting the vehicle 225 until the artificial intelligence software is updated. In another example, the control data 228 may permit the vehicle to be started, but may prevent the vehicle 225 from using any mode that employs the out of data artificial intelligence software (e.g., an autopilot feature).

In another example, vehicle sensor software that is configured in communication with the ECU may be out of data causing a potential safety issue. In such an example, the cloud service 206 may set the inhibitor bit and/or may trigger update of the sensor software. The inhibitor bit may prevent starting the vehicle 225 until the sensor software issue is remedied. In other examples, the vehicle manufacturer may detect a safety issue (e.g., an issue resulting in a recall) and may set the inhibitor bit remotely by authenticating with and communicating with the cloud service 206. The inhibitor bit may be set to prevent operation of the vehicle until the safety issue is remediated. The motor inhibition example is merely illustrative and other components of the vehicle may also be controlled using such rules and/or control bits (such as the aforementioned inhibitor bit). In some examples, setting such control bits and/or defining the rule data to be stored in association with the vehicle identifier data may not require the same authentication procedure as the key fob. For example, the vehicle identifier data and one or more passwords may be used to authenticate to the cloud service 206 in order to modify the rule data and/or control bits.

For example, operation of the vehicle may be inhibited outside of a particular geofence, electronic locks may be inhibited until the appropriate vehicle taxes are paid (preventing access to the vehicle), etc. Accordingly, if the vehicle state data 182 indicates that the vehicle is currently outside the relevant geofence, the inhibitor bit may be set and the operability of the vehicle may be prohibited.

At block 224, the inhibitor bit(s) associated with the particular condition determination logic (which is, in turn, associated with the identifier data (e.g., the ECU ID) may be checked in order to evaluate the condition determination logic using the most recent vehicle state data 182. Control data (e.g., executable instructions) may be sent to the vehicle ECU (block 226). For example, control data 228 may prevent the motor from starting for the current key fob press (or other vehicle start control) until a software issue is remedied. In addition, the inhibitor status 230 may be sent to the vehicle. The inhibitor status may output relevant data according to the pertinent condition. For example, if the vehicle motor is inhibited due to a missed payment, expired registration, the vehicle being operated outside of a predefined geofence, the vehicle being operated with less than a certain percentage of fuel/battery life, the vehicle being greater than a threshold distance from the owner's home, etc., the inhibitor status may display (or otherwise output) that the vehicle cannot be started until the situation is remediated. Upon successful remediation, the relevant party may access the cloud service 206 in order to have the inhibitor bit changed. The inhibitor status 230 may not, in all cases, be output by the vehicle so that it is perceivable by the vehicle owner.

In various examples, the cloud service 206 may be implemented as a serverless function (e.g., in a container-based cloud-computing architecture). Software implemented on such serverless functions may awaken in response to a service call (e.g., from the vehicle 225, the key fob 262, and/or another device). Accordingly, there may be no requirement that a server constantly execute a service that can receive, parse, and respond to inputs and provide the relevant outputs. Instead, the serverless function may deploy the functionality described above only when required. This may provide greater accessibility for the service as the service may not be interrupted by downtime and/or maintenance of any particular server. Additionally, the particular authentication procedure described above using a serverless function such as cloud service 206 may prevent spoofing attacks, such as the rolling code attacks described above. The compute resources needed to execute the logic described above may be deployed on an as-needed basis in response to receipt of a request. It should be noted that although some specific examples are provided herein, the particular condition determination logic as well as the vehicle state data being evaluated using such logic depends on the desired implementation by the vehicle manufacturer. Similarly, the vehicle state data 182 sent by the vehicle 225 may depend on the sensors and other systems communicating with the ECU of the vehicle 225 and on the implementation of the cloud-based vehicle control system.

Figure 3:
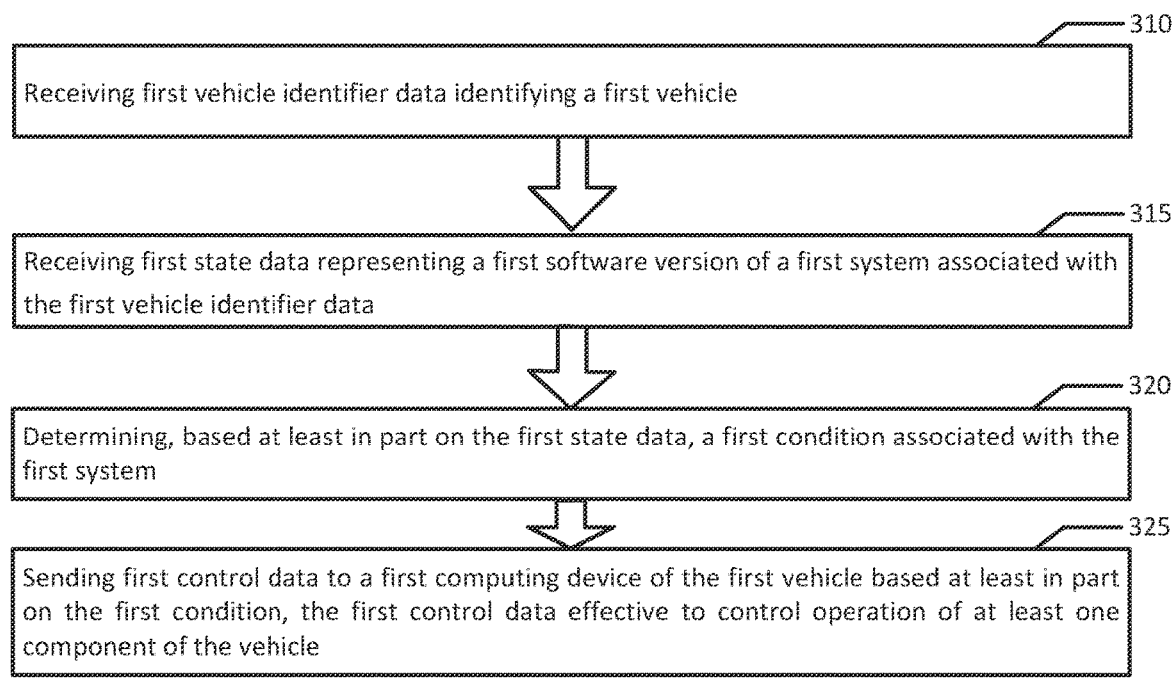
FIG. 3 is flowchart illustrating an example process for cloud-based vehicle control according to an example of the present disclosure.

FIG. 3 is a flowchart illustrating an example process 300 for cloud-based vehicle control according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes receiving first identifier data identifying a first vehicle (block 310). For example, the ECU of the vehicle (e.g., vehicle 225) may authenticate with a cloud service (e.g., a serverless function, such as cloud service 206). In various examples, the cloud service may input a first number received from the vehicle ECU into a cryptographic function (e.g., a hash function) to generate a first authentication code (e.g., a hash value). In various examples, the cloud service may send the first number to a messaging service to have a message that includes the first number generated by the messaging service. The message may only be accessed when a key fob or other device that pertains to the vehicle system that sent the first number is successfully authenticated to the cloud service. The cloud service may store the first authentication code in a data store that is specific to the authenticated vehicle system. In various examples, a notification may be sent to a remote device associated with the vehicle. For example, the cloud service may send a notification to a key fob associated with the vehicle. The notification may be data indicating that a request is pending and may cause the key fob to send authentication credentials to the cloud service in order to have the request performed. Accordingly, the key fob may authenticate to the cloud service. In various examples, a second authentication code may be generated based on a request received from the remote device associated with the vehicle. After authentication, the remote device (e.g., the key fob) may retrieve the first number from the messaging service. The cloud service may input the retrieved first number into the cryptographic function (e.g., a hash function) to generate the second authentication code (e.g., a hash value). The cloud service may compare the first authentication code with the second authentication code to determine if there is a match.

Upon determining that the first authentication code and the second authentication code match, a secure communication channel may be established between the serverless function and the vehicle ECU. The first vehicle identifier data that identifies the first vehicle may be sent (e.g., in encrypted format) via the secure communication channel.

Processing may continue at block 315, at which first state data may be received by the serverless function from the vehicle ECU. The first state data may comprise various information about the vehicle and/or about systems/subsystems of the vehicle. For example, the first state data may describe a software version of each software being executed by the various systems/subsystems of the vehicle. This software version information may include a first software version of a first system. The first state data including the first software version information may be sent in association with the first vehicle identifier data such that the serverless function is able to identify that the first state data pertains to the vehicle identified by the first vehicle identifier data.

In some examples, a determination may be made, based at least in part on the first state data, of a first condition that is associated with the first system (block 320). For example, condition determination logic 186 that is associated with the first vehicle identifier data may be retrieved. The condition determination logic 186 may evaluate different rules/thresholds to determine an appropriate condition. For example, the first software version of the first system may be checked against a current software version of the software to determine if the software of the first system is up to date. Various other aspects of the first state data may be checked, depending on the particular logic to determine a predefined condition. For example, the fact that the first software version is not the most current version may not be enough, by itself, to determine a predefined dangerous condition that results in control data configured to render the vehicle inoperable. However, the condition determination logic 186 may dictate that if the first software version is out of date and the vehicle is traveling more than 65 mph, a dangerous condition may exist and control data may be pushed to the vehicle that is effective to limit a maximum speed that the vehicle may travel until the software is updated and the dangerous condition is remedied. In some examples, the first condition determined using the condition determination logic and the first state data may result in an inhibitor bit being set by the serverless function. The inhibitor bit may prevent starting of the vehicle and/or may result in limited vehicle functionality (depending on the particular condition, vehicle state, and condition determination logic). The particular condition determined and the particular condition determination logic used to evaluate the first state data will vary according to the desired implementation.

Processing may continue to block 325, which may include sending first control data to a first computing device of the first vehicle (e.g., an ECU of the first vehicle) based at least in part on the first condition. The first control data may be effective to control operation of at least one component of the vehicle. For example, the first state data and the condition determination logic may indicate that automatic windshield wiper control software may be out of date. The older version may have a bug that causes the windshield wiper motor to operate in an overspeed mode that may result in motor burnout when a particular wiper speed setting is selected. In this example, the first control data may allow nominal vehicle operation, but may prevent the relevant windshield wiper setting from being selected until the control software has been updated to fix the bug. In some examples, the control data may disable vehicle operation (e.g., a user may be prevented from starting the vehicle motor) and/or may not allow a user to enter the vehicle (all doors may remain locked). The particular control data generated may, again, depend on the desired implementation, the particular condition determination logic, and the received vehicle state data.

Figure 4A:
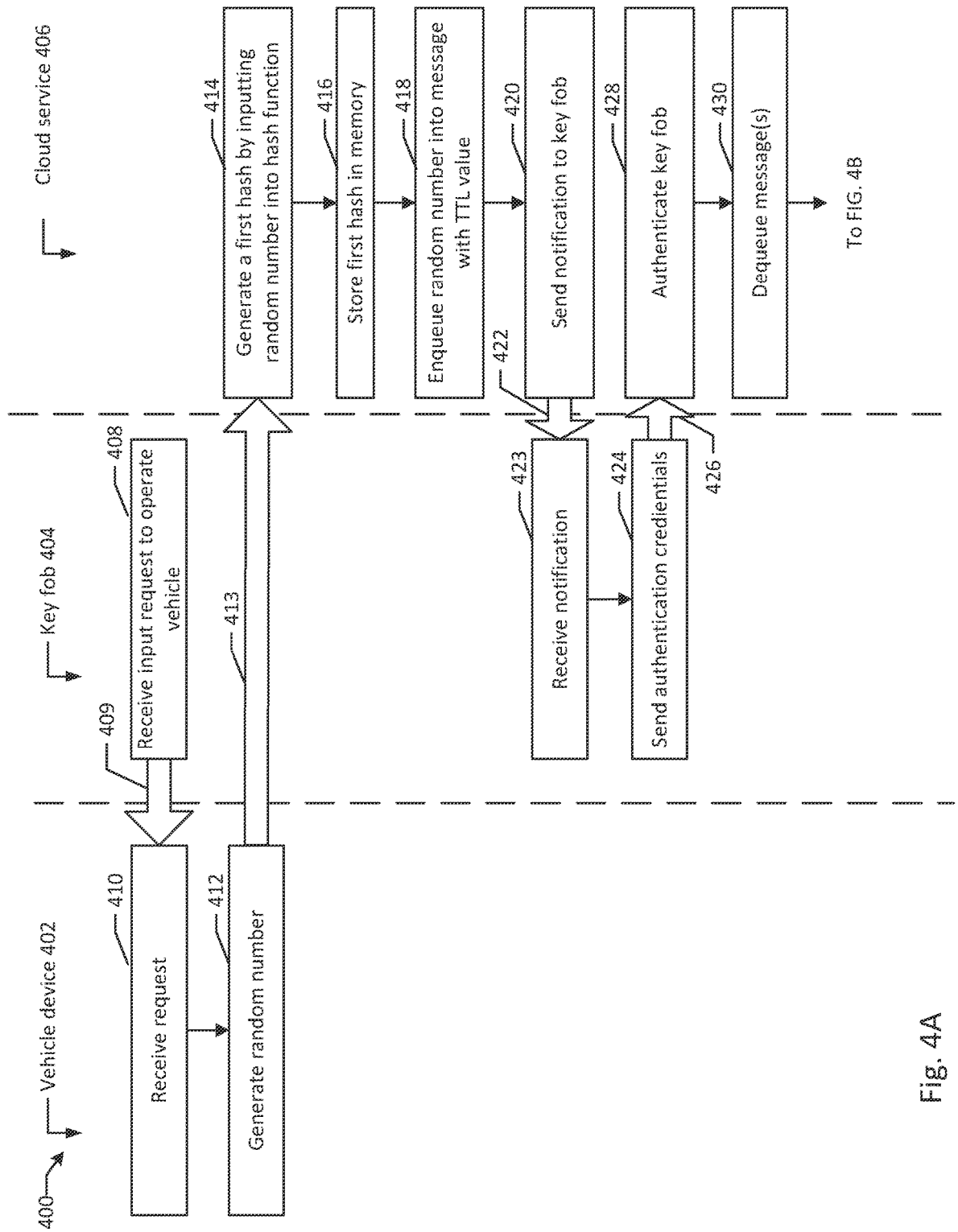
FIGS. 4A-4B are a flow diagram illustrating another example another example process for cloud-based vehicle control according to an example of the present disclosure.
Figure 4B:
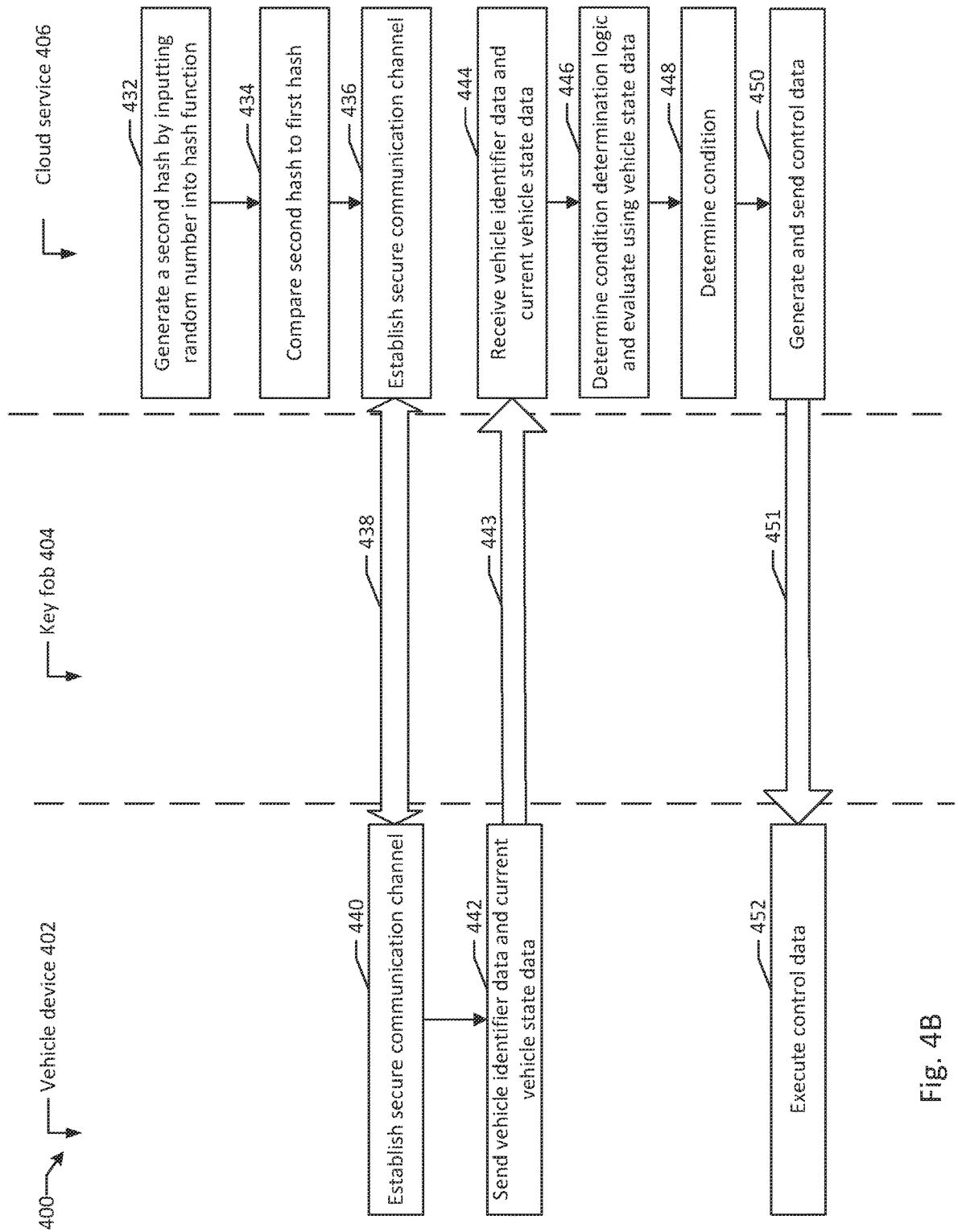

FIGS. 4A, 4B illustrate a flow diagram 400 of communication between a vehicle device, a key fob, and a cloud service to provide vehicle control according to various aspects of the present disclosure. Although the examples below are described with reference to the flow diagram illustrated in FIGS. 4A, 4B, it will be appreciated that many other methods of performing the acts associated with FIG. 4A, 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example depicted in FIGS. 4A, 4B, key fob 404 (or some other device associated with vehicle device 402 (e.g., a mobile device)) may receive an input request to operate a vehicle (block 408). The input request may be, for example, a button press on the key fob, a voice command, a button push on a vehicle interface, etc. The vehicle device 402 may receive the request 409 from the key fob 404 (block 410). The request 409 may be sent via radio frequency and/or using a different communication protocol or may be directly entered (e.g., by a button push or voice command on a vehicle interface). The request 409 may not include any codes, but may instead merely indicate that the key fob 404 or other vehicle control interface has received an request. Vehicle device 402 may authenticate with cloud service 406 (using a passcode, for example). After successful authentication, vehicle device 402 may generate a random number (e.g., a pseudo-random number) in response to the unlock request received from the key fob (block 412). The vehicle device 402 may send the random number 413 to cloud service 406 using a secure Internet communication protocol. Cloud service 406 may generate a first hash by inputting the random number 413 into a hash function (block 414). For example, the hash function may be a cryptographic hash function configured to take numerical input in order to generate an unlock code (e.g., a hash). The cloud service 406 may store the first hash in memory (block 416). The memory may be a data store that is specific to the vehicle device 402.

The cloud service 406 may enqueue the random number into a message with a TTL value (block 418). For example, the cloud service 406 may use a messaging protocol to generate a message that includes the random number 413. The message may be specific to the vehicle device 402 and the key fob 404. The TTL value may define a time period. After the time period elapses, the random number may be deleted. The cloud service 406 may send a notification 422 to the key fob 404 (block 420). The notification 422 may be sent via the secure Internet communication protocol. The key fob 404 may receive the notification 422 (block 423). The notification 422 may be effective to trigger the key fob 404 to send authentication credentials 426 to the cloud service 406 (block 424). The cloud service 406 may authenticate the key fob 404 (block 428) using the authentication credentials 426. In response to successful authentication of the key fob 404, the cloud service 406 may dequeue the message(s) that are associated with the key fob 404 using the messaging protocol (block 430) (e.g., by communicating with a message broker of the messaging protocol).

In the example, the cloud service 406 may generate a second hash by inputting the random number into the hash function (block 432). For example, the random number retrieved from the message may be input into the cryptographic hash function to generate a second hash (e.g., a second unlock code). The cloud service 406 may compare the second hash to the first hash (block 434). The cloud service 406 may determine that the first hash and the second hash match. The cloud service 406 and the vehicle device 402 may establish a secure communication channel 438 (blocks 436, 440). For example, the vehicle device 402 and/or the cloud service 406 may perform a handshake procedure and may exchange cryptographic keys. The vehicle device 402 may send (e.g., periodically) vehicle identifier data and current vehicle state data 443 (block 442) to the cloud service 406. The cloud service 406 may receive the vehicle identifier data and the associated current vehicle state data (block 444). The cloud service 406 may use the vehicle identifier data to lookup the condition determination logic associated with the vehicle identifier data and may evaluate the condition determination logic using the vehicle state data (block 446). Various examples of such evaluation are described above; however, the particular workflow, algorithm, etc., is dependent on the desired use case. In various examples, the condition determination logic may prioritize different actions and/or may determine dependencies between different vehicle systems/subsystems in order to determine the relevant condition and control data. The cloud service 406 may determine a condition of the vehicle (block 448) which may be the result of evaluating the condition determination logic using the current vehicle state data. The determined condition may, in turn, be associated with a particular control action (or multiple control actions) that is to be used to control the vehicle and/or the vehicle device 402 (e.g., in order to remediate a dangerous condition and/or fix a known issue). Accordingly, control data 451 (e.g., executable instructions effective to control operation of one or more vehicle systems/subsystems) may be generated and sent to the vehicle device 402 using the secure communication channel 438. The vehicle device 402 may receive and execute the control data (block 452) in order to control operation of one or more systems/subsystems of the vehicle in accordance with the control data 451.

FIG. 5 is block diagram of an example system 500 for cloud-based vehicle control according to an example of the present disclosure. The system 500 may include one or more processors 502 and non-transitory computer-readable memory 504. Non-transitory computer-readable memory 504 may store instructions 506 that may be effective to cause the one or more processors 502 to receive first vehicle ID data 508 that identifies vehicle 502. Additionally, the non-transitory computer-readable memory 504 may store instructions 506 that may be effective to cause the one or more processors 502 to receive first state data 510. The first state data 510 may represent a first software version of a first system 514 associated with the first vehicle identifier data 508. Examples of the first system 514 may include any software and/or hardware based system of the vehicle 502 (e.g., control systems, climate systems, entertainments systems, etc.).

The instructions 506 may program the one or more processors 502 to evaluate the first state data 510, including at least a first software version of the first system 512 to determine a first condition 516 associated with the first system 514. The first condition 516 may be, for example, that a particular software version of a particular vehicle component (e.g., one or more of component(s) of vehicle 530) is out of date, that a particular system/sub-system/component of the vehicle 502 is malfunctioning, that a particular setting of a system/sub-system/component of the vehicle 502 should be modified, priority data for modifying various system settings, etc. The instructions 506 may control the one or more processors 502 to send first control data 522 to the first computing device 520 of the vehicle 502 based at least in part on the first condition 516. In various examples, the order of control data sent to the first computing device 520 (e.g., an ECU of vehicle 502) and/or instructions specifying an order of execution of the control data may also be provided.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving, by at least one processor, vehicle identifier data identifying a vehicle;
receiving, by the at least one processor, first state data indicating a software version of a vehicle system associated with the vehicle identifier data;
determining, by the at least one processor, a condition associated with the vehicle system based on the software version of the vehicle system;
determining, by the at least one processor, at least one component of the vehicle to be disabled or limited based on the condition;
generating, by the at least one processor, control data to disable or limit operation of the at least one component; and
sending, by the at least one processor, the control data to a computing device of the vehicle to disable or limit the operation of the at least one component.

2. The method of claim 1, further comprising:
generating a first authentication code based at least in part on first data received from the computing device of the vehicle, wherein the computing device of the vehicle is associated with the vehicle identifier data;
generating a second authentication code based on a request received from a remote device associated with the first vehicle; and
determining that the first authentication code matches the second authentication code.

3. The method of claim 2, further comprising determining the condition based at least in part on the first authentication code matching the second authentication code.

4. The method of claim 1, wherein the condition indicates a problem with the vehicle system when operated using the software version.

5. The method of claim 1, wherein the at least one component includes a motor of the vehicle, and wherein the control data is effective to prevent operation of the motor of the vehicle.

6. The method of claim 1, wherein the at least one component of the vehicle includes the vehicle system, and wherein the control data is effective to disable the vehicle system during operation of the vehicle.

7. The method of claim 1, wherein the control data is effective to trigger a software update of the vehicle system of the vehicle.

8. The method of claim 1, further comprising:
receiving second state data indicating respective software versions of each system of a plurality of other vehicle systems associated with the vehicle identifier data; and
evaluating a set of rules using the first state data and the second state data to determine the condition.

9. The method of claim 1, wherein the at least one processor is external to the vehicle.

10. The method of claim 1, wherein the method is performed by a serverless function executing on the at least one processor.

11. The method of claim 1, further comprising:
determining, by the at least one processor, that the software version is outdated or contains a bug; and
in response to determining that the software version is outdated or contains a bug, sending, by the at least one processor, the control data to the computing device to disable or limit the operation of the at least one component.

12. The method of claim 1, wherein the at least one component includes the vehicle system.

13. A system comprising:
at least one processor; and
a non-transitory computer-readable memory storing instructions that, when executed by the at least one processor, are effective to:
receive vehicle identifier data identifying a vehicle;
receive first state data indicating a software version of a vehicle system associated with the vehicle identifier data;
determine a condition associated with the vehicle system based on the software version of the vehicle system;
determine at least one component of the vehicle to be disabled or limited based on the condition;
generate control data to disable or limit operation of the at least one component; and
send the control data to a computing device of the vehicle to disable or limit the operation of the at least one component.

14. The system of claim 13, the non-transitory computer-readable memory storing further instructions that, when executed by the at least one processor, are further effective to:
generating a first authentication code based at least in part on first data received from the computing device of the vehicle, wherein the computing device of the vehicle is associated with the vehicle identifier data;

generating a second authentication code based on a request received from a remote device associated with the vehicle; and determining that the first authentication code matches the second authentication code.

15. The system of claim 14, the non-transitory computer-readable memory storing further instructions that, when executed by the at least one processor, are further effective to determine the condition based at least in part on the first authentication code matching the second authentication code.

16. The system of claim 13, wherein the condition indicates a problem with the vehicle system when operated using the software version.

17. The system of claim 13, the non-transitory computer-readable memory storing further instructions that, when executed by the at least one processor, are further effective to:

receive second state data indicating respective software versions of each system of a plurality of other vehicle systems associated with the vehicle identifier data; and evaluate a set of rules using the first state data and the second state data to determine the condition.

18. The system of claim 13, wherein the computing device is an electronic control unit configured to control an electromechanical subsystem of the vehicle.

19. A method comprising:

sending, by a computing device of a vehicle, vehicle identifier data to a processor;

sending, by the computing device and to the processor, state data indicating a software version of a vehicle system associated with the vehicle identifier data, wherein the processor is configured to:

determine a condition associated with the vehicle system based on the software version of the vehicle system;

determine at least one component of the vehicle to be disabled or limited based on the condition;

generate control data to disable or limit operation of the at least one component; and send the control data to the computing device of the vehicle;

receiving, from the processor and by the computing device, the control data; and disabling or limiting, by the computing device, the operation of the at least one component of the vehicle based on the control data.

* * * * *